(12) United States Patent
Emrich

(10) Patent No.: US 9,301,620 B2
(45) Date of Patent: Apr. 5, 2016

(54) HUNTING SEAT

(71) Applicant: Michael Earl Emrich, Callaway, VA (US)

(72) Inventor: Michael Earl Emrich, Callaway, VA (US)

( * ) Notice: Subject to any disclaimer, the term of this patent is extended or adjusted under 35 U.S.C. 154(b) by 168 days.

(21) Appl. No.: 13/974,861

(22) Filed: Aug. 23, 2013

(65) Prior Publication Data

US 2014/0054942 A1 Feb. 27, 2014

Related U.S. Application Data

(60) Provisional application No. 61/742,912, filed on Aug. 23, 2012.

(51) Int. Cl.
*A47C 9/10* (2006.01)
*A47C 7/00* (2006.01)
*A01M 31/02* (2006.01)

(52) U.S. Cl.
CPC .................. *A47C 9/10* (2013.01); *A01M 31/02* (2013.01); *A47C 7/008* (2013.01)

(58) Field of Classification Search
CPC .......... A47C 9/10; A47C 7/008; A01M 31/02
See application file for complete search history.

(56) References Cited

U.S. PATENT DOCUMENTS

| | | | | |
|---|---|---|---|---|
| 1,904,388 A * | 4/1933 | Riddell | | 108/124 |
| 3,912,209 A * | 10/1975 | Turpin | | A45B 5/00 135/66 |
| 5,494,333 A * | 2/1996 | Wilson | | 297/344.18 |
| 5,522,642 A * | 6/1996 | Herzog | | 297/344.18 |
| 5,775,464 A * | 7/1998 | Gardner | | 182/187 |
| 5,779,314 A * | 7/1998 | Grace | | A47C 1/146 297/25 |
| 7,328,951 B2 * | 2/2008 | Ward et al. | | 297/344.18 |
| 8,678,489 B1 * | 3/2014 | Skinner | | 297/16.1 |
| 2002/0195528 A1 * | 12/2002 | Overbeck | | 248/188.6 |
| 2007/0187997 A1 * | 8/2007 | Smith | | 297/16.1 |
| 2012/0061180 A1 * | 3/2012 | Phillips | | 182/129 |

FOREIGN PATENT DOCUMENTS

| | | | | |
|---|---|---|---|---|
| GB | 1204507 A | * | 9/1970 | A47C 4/44 |
| GB | 2244211 A | * | 11/1991 | A47C 1/029 |
| GB | 2314505 A | * | 1/1998 | |

* cited by examiner

*Primary Examiner* — David R Dunn
*Assistant Examiner* — Tania Abraham
(74) *Attorney, Agent, or Firm* — Harris Beach PLLC

(57) ABSTRACT

A hunting seat includes a base coupled to a tube structure. The base has a first surface and a second surface. A seat has attached pivotally thereto an adjustment tube having a plurality of adjustment holes disposed within. The seat has a seating surface configured to support a person and a seat underside surface opposite to the seating surface. In a substantially flat ground use, the base is disposed with the first surface facing the seat underside surface and the adjustment tube disposed within and pinned to a tube of the tube structure. In a sloped ground use, the base is disposed with the second surface facing the seat underside surface and the adjustment tube pinned in a pair of brackets pivotally mounted to a section of the base. A method of operating a hunting seat is also described.

13 Claims, 11 Drawing Sheets

HUNTING SEAT

CROSS-REFERENCE TO RELATED APPLICATIONS

This application claims priority to and the benefit of U.S. provisional patent application Ser. No. 61/742,912, Unique hunting seat that adjusts for three different ground uses, filed Aug. 23, 2012, which application is incorporated herein by reference in its entirety for all purposes.

FIELD OF THE INVENTION

The invention relates to a hunting seat and particularly to a hunting seat for use over a variety of ground terrains.

BACKGROUND OF THE INVENTION

While hunting in all types of terrain types, hunters may spend long hours in a sitting position. Hunters often sit on naturally available structures including rocks and fallen trees. Such hunting seats can be uncomfortable and limit free movement of the hunter's body. Some seats used in hunting might be more comfortable, however seats of the prior art can limit the movement of the hunter's body. Also, seats of the prior art are typically only suitable for a specific terrain type, such as a relatively flat ground surface.

SUMMARY OF THE INVENTION

According to one aspect, a hunting seat includes a base coupled to a tube structure including a plurality of tubes. The base has a first surface and a second surface. A seat has attached pivotally thereto an adjustment tube having a plurality of adjustment holes disposed within. The seat has a seating surface configured to support a person and a seat underside surface opposite to the seating surface. In a substantially flat ground use configuration, the base is disposed with the first surface facing the seat underside surface and the adjustment tube disposed within and pinned to a tube of the tube structure. In a sloped ground use, the base is disposed with the second surface facing the seat underside surface and the adjustment tube pinned in a pair of brackets pivotally mounted to a section of the base.

According to another aspect, a hunting seat includes a base having a straight section joined by a base pin. Three tubes are pivotally coupled by the base pin to the base. A first tube and a third tube of the three tubes each has a bracket affixed thereto at one end. The first tube and the third tube are pivotally coupled at opposite ends respectively to a first seat tube and a second seat tube. The first seat tube and a second seat tube are coupled at opposite ends to a seat swivel. The seat swivel rotatingly is coupled to a seat post of a seat. A second center tube of the three tubes is configured to accept an adjustable tube fixed in place by a pin extending through both the adjustable tube to the second tube in one of a plurality of adjustment holes disposed in the adjustable tube. An opposite end of the adjustable tube is pivotally coupled to the seat swivel. A pair of brackets are welded to the base substantially opposite the straight section pivotally coupled to a support tube having a U bracket at an opposite end. In a substantially flat ground use, the U bracket is also couples to the second center tube and the adjustment tube by the pin extending through both the adjustable tube to the second tube. In a sloped ground use, the first tube and a third tube are pivotally resting substantially on the base opposite from the straight section and the adjustable tube engaged by a pin through one of the plurality of adjustment holes and the brackets affixed thereto at one end.

In one embodiment, the base includes a ring.

In another embodiment, at least one of the tubes is a hollow metallic tube.

In yet another embodiment, the seat includes a plywood circle.

In yet another embodiment, the seat swivel is affixed by screws to the plywood circle.

In yet another embodiment, the seat swivel is configured to allow the seat to rotate 360 degrees.

In yet another embodiment, the seat includes an upholstered cover.

In yet another embodiment, the pin includes a pin with a ring pull.

In yet another embodiment, at least one pivotally coupled joint includes a rivet disposed through at least two tubes.

In yet another embodiment, the seat is configured to be strapped to a tree.

According to yet another aspect, a method of operating a hunting seat including the steps of: providing a hunting seat having base with a pivotally coupled support structure of tubes configured for use on flat ground or sloped ground; rotating the base to a first side and coupling an adjustable tube into a tube coupled to the base and to a support tube by a pin to configure the hunting seat for use on flat ground; or by rotating the base to a second side and coupling an adjustable tube to a pair of brackets pivotally coupled by a base pin to the base by a pin in one of a plurality of through holes on the adjustment tube to fix an angle that substantially places a seat of the hunting seat in a horizontal position to configured the hunting seat for use on a sloped ground.

In one embodiment, the step of providing a hunting seat further includes providing a hunting seat configured for use on flat ground and strappingly coupling the hunting seat to the base of a tree.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
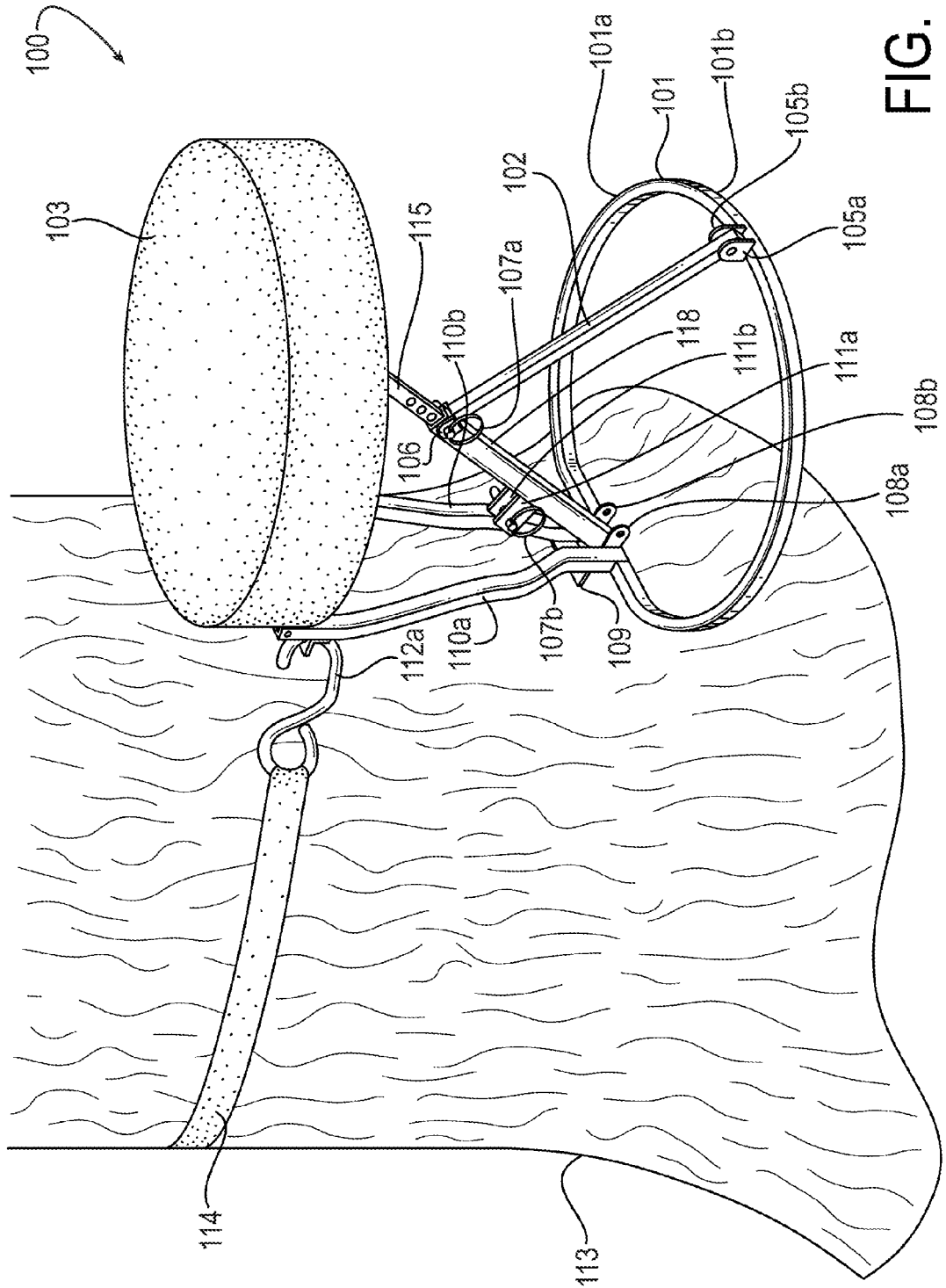
FIG. 1 shows an illustration of one exemplary embodiment of a hunting seat configured as a hunting seat that attaches to a tree.

As discussed hereinabove, natural hunting seats such as fallen trees or rocks can be uncomfortable and limit free movement of the hunter's body. Even where seats are used, they too can limit movement of the hunter's body. What is needed is a more comfortable hunter's seat that does not limit the hunter's movements. Also, what is needed is a hunter's seat that has a compact configuration for storage and travel. Also, a hunter's seat is needed that can easily and robustly be adapted to a wide variety of hunting terrains.

A novel multi-purpose hunting seat which solves the aforementioned problems is described hereinbelow. One of the unique features of the multi-purpose hunting seat is its adjustability. The multi-purpose hunting seat can be configured as at least three different kinds of seats, each with a 360 degree swivel seat. The multi-purpose hunting seat can be adapted to a wide variety of ground conditions by use of a number of adjustments (e.g. in some embodiments, six adjustments). The multi-purpose hunting seat can be configured, for example, as a "ground stool", a "seat that attaches to a tree", and as a seat adapted to a sloped ground (e.g. in some embodiments, up to a ground slope of about 34 degrees). In most embodiments, adjustments can be conveniently made by sliding a pin into a pair of holes in a tube (e.g. a square metallic tube) or into one of a series of a row of tube length adjustment holes, such as, for example, by changing which hole a ¼" pin is inserted into.

A base for the multi-purpose hunting seat can be made from square tubing rolled to a desired diameter ring (or, any other suitable base shape). For example, in some embodiments, the base is made from ½" square tubing, rolled to about a 12" diameter ring with a straight section where the ring is joined. In one embodiment, there are two tubes (e.g. ½" square tubes) press formed with a square tube (e.g. a ⅝" square tube) that is placed between the rolled ring. All three tubes have a hole (e.g. a 5/16" hole) at the bottom where a pin (e.g. a 2½" long pin) is pushed through all three pieces then plug welded to the 12" dia. ring so the three pieces can swivel about the pin. Any suitable rod or pinning method can be used such that the three pieces can swivel about the pin and thus about a plane defined by the ring. In some embodiments, the ring where joined also has the ring (e.g. the tube of the ring) straightened for approximately 1½" each way so the pin can slide in before welding. The two tube (e.g. ½" square tubes) also have two pieces of angle (e.g. ⅛"×¾"×¾" angle) welded to join the two together. These two angles also help hold the seat to the tree when used as a tree seat. The top angle can have two holes to hold a strap that can be tightened to hold it to the tree.

In some embodiments, at the front of the ring (e.g. a 12" dia. ring) is a U shaped bracket that is welded to the top of the ring. A tube (e.g. a ½" square tube with a ¼" rivet) holds the tube to the bracket. At the top of the tube (e.g. a ½" square tube) is another U bracket welded with a ¼" hole through the bracket. This is a front support to help hold the seat when sitting on it.

In some embodiments, at the top of the formed frame is another formed frame. This frame swivels from two swivel points (e.g. by ¼" rivets). Towards the front of this frame is a 1⅛" round tube welded to the ½" square tubes. This is where the seat fastens. There can also be a bushing (e.g. bushing 801, FIG. 8), preferably formed of nylon, pressed in so the seat can swivel. At the ends of the ½" square tube are two pieces of angle iron welded for a hinge point where another piece of ½" square tube is hinged. There are adjustment holes in this tube where a pin can be pushed through for adjusting the seat.

In some embodiments, the top seat is a round piece of ½" plywood (e.g. approximately 11" in diameter) with cushion (e.g. a 2" thick round cushion) glued and covered, for example, with a camouflage ("camo") patterned material. The bottom of the plywood can be covered with a vinyl material. There is a welded bracket fastened with four screws to the plywood. This bracket fits into the bushing with a snap ring to hold seat from being accidentally removed.

A hunting seat as described herein can be adjusted in multiple ways for at least three different uses, as a "ground stool", a "seat that attaches to a tree", and as a seat adapted to a sloped ground. The seat top can be adjusted, and in some embodiments, there can be six adjustments. The hunting seat can be leveled even when the base of the hunting seat is tilted.

Exemplary Embodiment

An exemplary embodiment of the hunting seat as described hereinabove was built and tested. FIG. 1 to FIG. 10 show photographs that illustrate the use of the hunting seat as adapted and configured for three different uses, as a "ground stool", a "seat that attaches to a tree", and as a seat adapted to a sloped ground. As shown in the drawings, one single structural configuration can be re-configured to accomplish all three uses. Various tubes can be pivotally adjusted about a plurality of pivot or swivel points and rotationally about the circular base to achieve reconfiguration of the hunting seat.

FIG. 1 shows an illustration of a hunting seat 100 configured as a hunting seat that attaches to a tree 113, typically at about the base of the tree. The members of the hunting seat have been formed and in some cases bent from metallic tubing. Most of the exemplary members were formed from a square tube, with an occasional round tube used, for example, to form the seat bushing. Rods are also used both in the form of pins, pivot points for rotation, and for the rotating (360 degree swiveling chair seat 103). Some brackets and metal plate supports were welded to the tubes. As can be seen in FIG. 1, in the hunting seat that attaches to a tree configuration, typically most or all of the weight of the chair and occupant of the chair, is borne by a strap 114, preferably an adjustable or ratcheting strap, affixed to one or more members of the hunting chair by one or more hooks, such as by hook 112a which is visible in FIG. 1. The seat 103 is held in a desired position by adjustable tube 115 which fits into tube 118. A first end of tube 115 attached to the underside of seat 103 by means which is explained in more detail in other drawings. The second end of tube 115 fits length adjustably into a first open end of tube 118. The length adjustment is fixed by a pin 107a which pushes through two through holes in tube 118 as well as one set of a plurality of through holes 116 (not clearly visible in FIG. 1) in tube 115. The second end of tube 118 also includes a set of through holes and is pivotally attached to the base (e.g. ring base 101) by a base pin, ring pin, rod, or rivets, not visible in FIG. 1. Also held pivotally captive by the same base pin (e.g. a ring pin) are forked tubes 110a and 110b. Tube 115 and tube 118 are length adjustably pinned together, and also join by a common pin to a U bracket 106 which is at one end of support tube 102. The other end of support tube 102 is pivotally pinned to two brackets with holes (bracket 105*a* and bracket 105*b*). Thus, the seat is further structurally supported by force transmitted via tube 102 through ring 101 back to the tree 113.

The length adjustment of tube 115 as set by pinning adjustable tube 115 to tube 118 at one of the plurality of through holes 116 can be used to set the height of seat 103 above the base. In the seat that attaches to a tree configuration, the length adjustment can also be used to set the inclination of the seat surface with respect to the tree. Minor corrections to the seat inclination can be used to correct for a tree slant off vertical.

Figure 9:
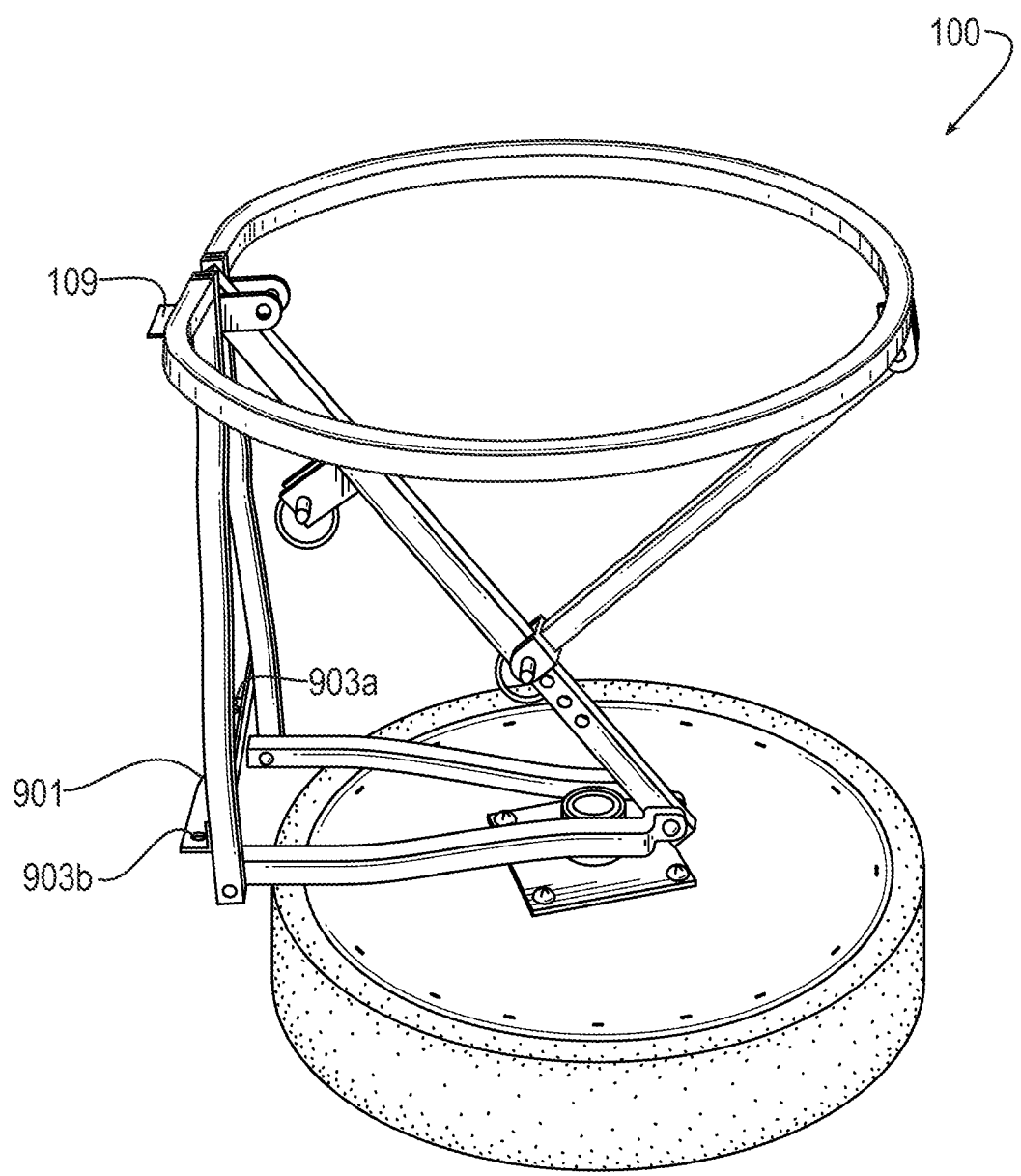
FIG. 9 is an illustration showing the support tube U bracket pinned to the adjustable tube.

Also, as can be seen in FIG. 9, angle bracket 109 includes a bracket section which acts as a tang to engage the bark of the tree for more stability. Similarly, the longer angle bracket 511 has a cutout, typically a "V" shaped cutout (e.g. V shaped cutout 901, FIG. 9 and FIG. 11) which also engages the bark of the tree to help stabilize the seat and limit movement of the hunting seat with respect to the tree.

Bracket 108*a* and bracket 108*b* are visible, however not typically used in this configuration. Note that bracket 108*a* is affixed to tube 110*a* and bracket 108*b* is affixed to tube 110*b* and thus both rotate about the ring pin along with the respective tubes to which they are attached. Ring tube 101 has a first surface 101*a* and an opposite second surface 101*b*. The only significance of first surface 101*a* and an opposite second surface 101*b* is that in some configurations the ring is used with first surface 101*a* facing the underside of seat 103 and in other configurations, the ring tube 101 is rotated pivotally about the ring pin whereby, as will be seen in later figures, opposite second surface 101*b* faces the underside of seat 103. In this exemplary embodiment, brackets 105*a* and 105*b* are welded to the first side 101*a* of ring tube 101 and are not pivotally adjustable about the ring tube 101. Thus in some drawings, observation of the orientation of brackets 105*a* and 105*b* can help the reader to ascertain the orientation of ring tube 101. Also, to facilitate an understanding of the re-configuration of the hunting chair as described herein, note that in some configurations some tubes, such as, for example, support tube 102, can be rotated to a convenient out of the way or "stowed position" when not in use.

Figure 2:
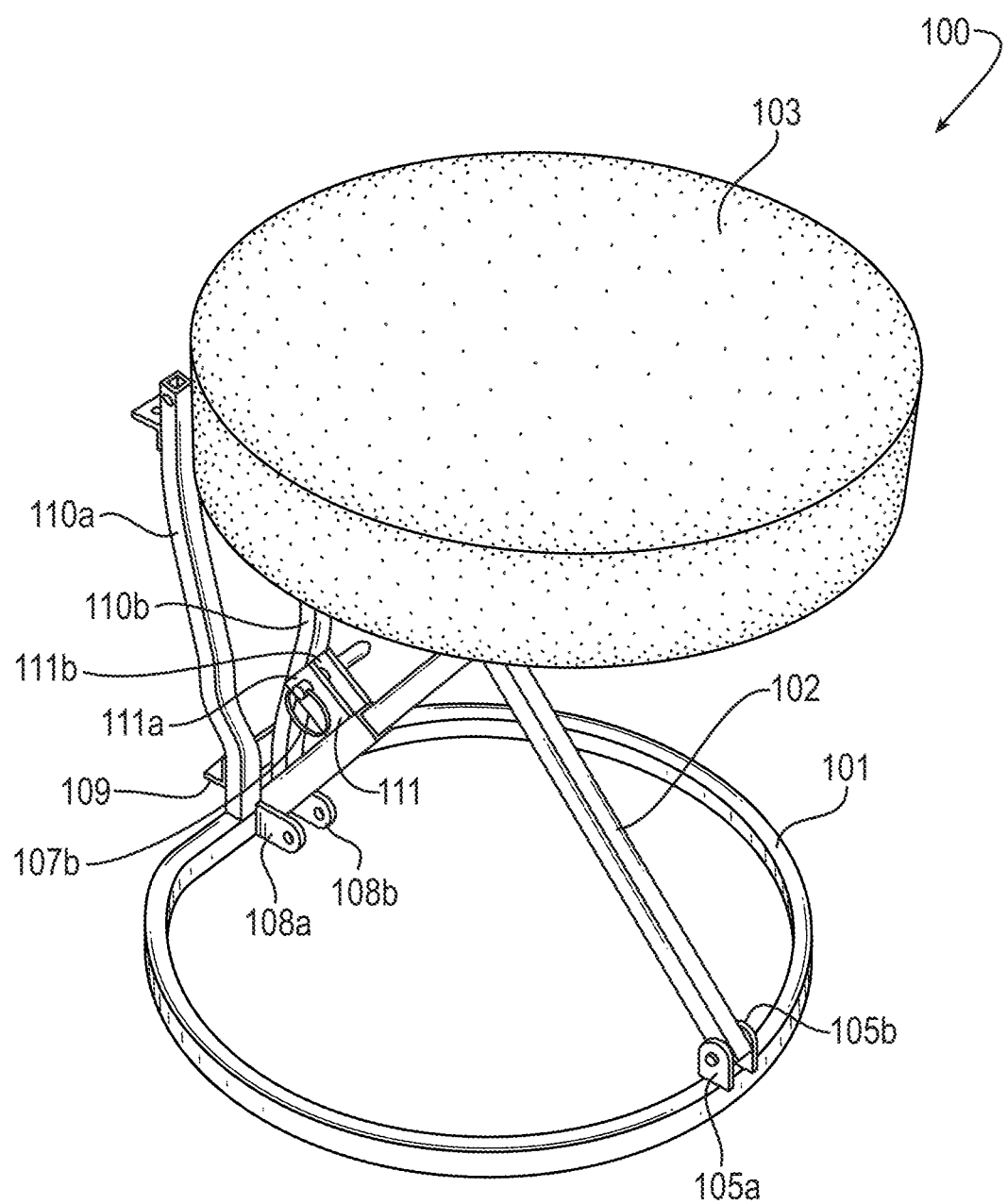
FIG. 2 shows an illustration of the hunting seat of FIG. 1 configured as a hunting seat used as a ground stool.

FIG. 2 shows an illustration of the hunting seat 100 in one of two possible configurations as a hunting seat used as a ground stool. This configuration is similar to the configuration of FIG. 1, except that the mass of the hunting seat 100 and anyone sitting on the hunting seat is now supported by the base at the surface on which it sits, such as a grass covered area as shown in FIG. 2. A relatively small welded brace angle bracket 109 is better seen in FIG. 2 where it can be seen that the welded plate holds tubes 110*a* and 110*b* together and forces them to pivot together about the ring pin.

Figure 3:
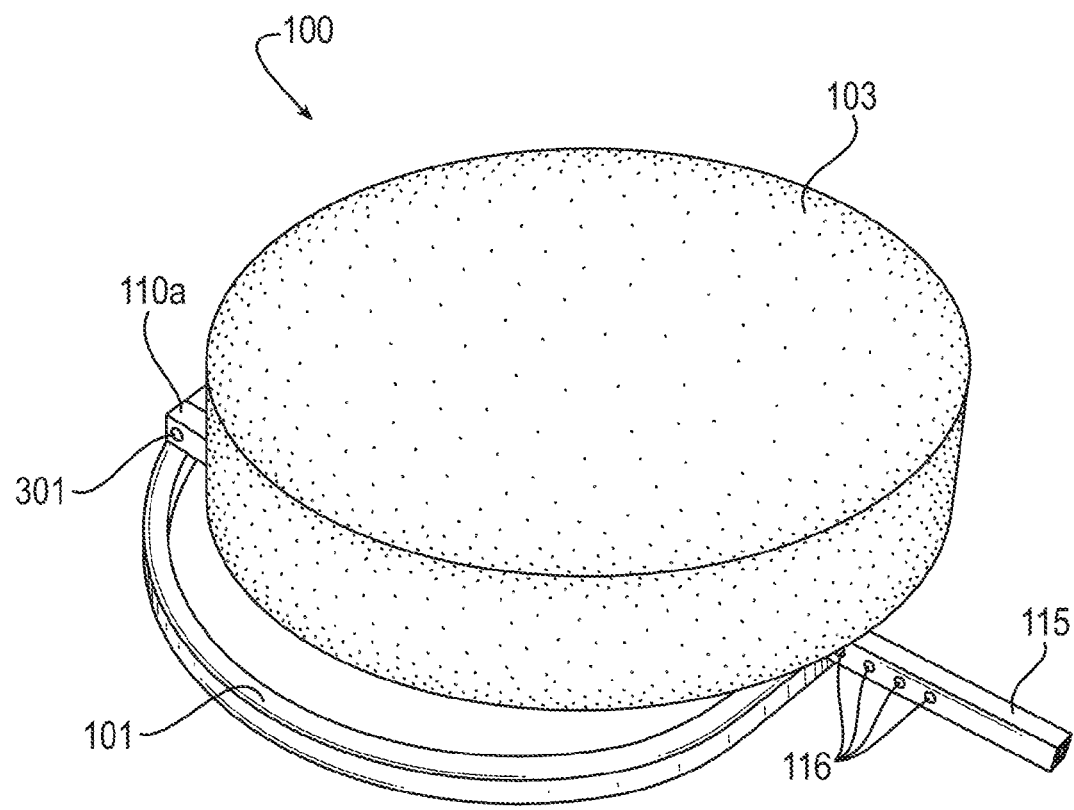
FIG. 3 shows an illustration of another configuration of the hunting seat of FIG. 1 as a hunting seat used as a ground stool very close to the ground or as a compact structure for storage or transport.

FIG. 3 shows an illustration of another configuration of hunting seat 100 as a hunting seat used as a ground stool very close to the ground. This configuration is also useful to reduce the volume occupied by the hunting seat 100 for compact transport and/or storage. Tubes 110*a* and 110*b* can be seen to have been rotated pivotally about the ring pin (not visible in FIG. 3) to about a horizontal position. Adjustable tube 115 can be seen to be resting on ring tube 101. In the configuration of FIG. 3, tube 102 is stowed in a lower section inside of U shaped bracket 111 (111*a*, 111*b*) (U shaped bracket 111 is affixed to tube 118) and held in place by pin 107*b*.

Figure 4:
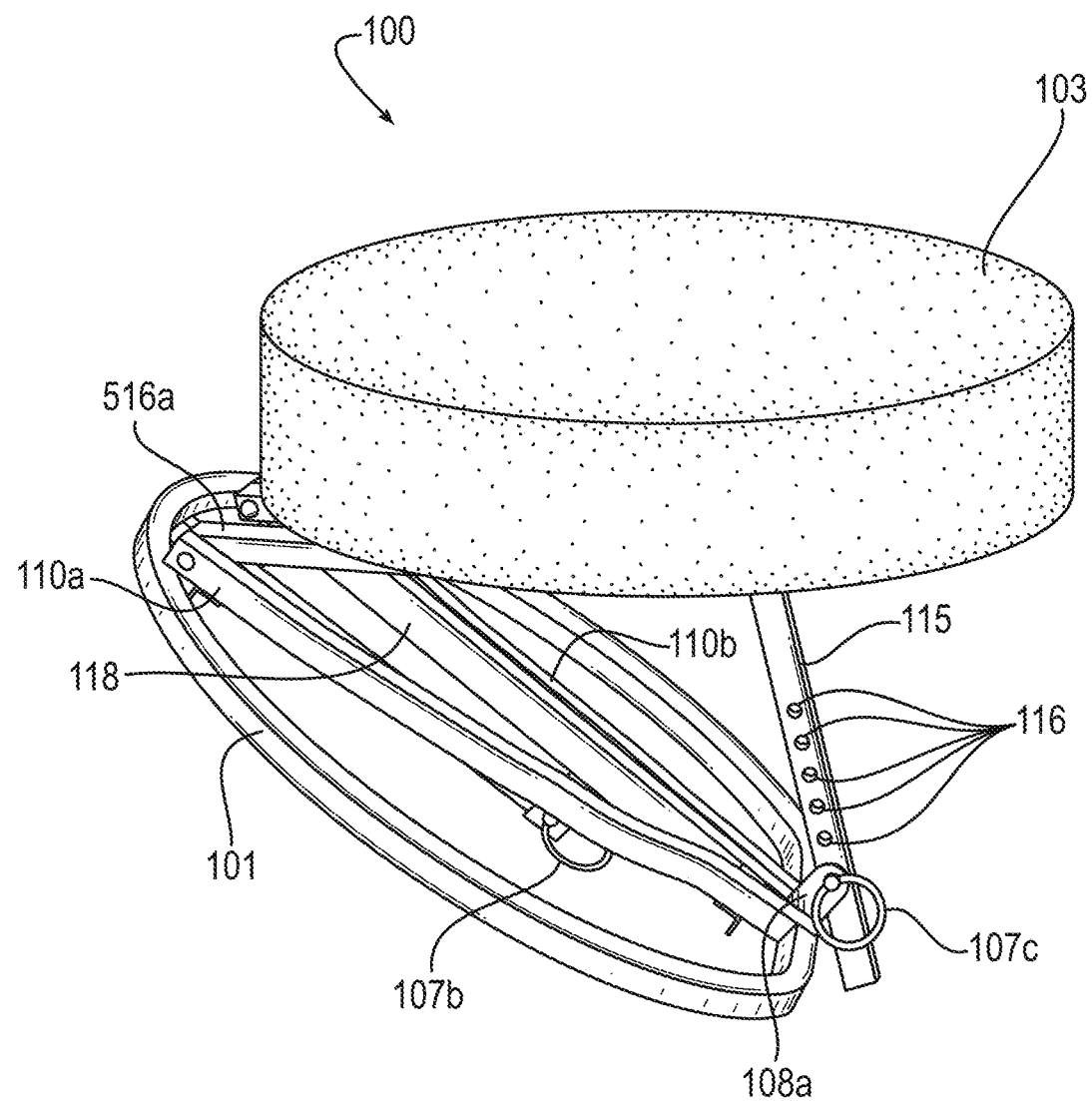
FIG. 4 shows an illustration of the hunting seat of FIG. 1 configured as a seat adapted to a sloped ground.

FIG. 4 shows an illustration of yet another configuration of hunting seat 100 as a seat adapted to a sloped ground. Notice that in the ground slope configuration of FIG. 4, by pivotally adjusting the ring tube about the ring pin, now brackets 105*a* and 105*b* are no longer in use and are on the underside of ring tube 101. Also, now tube 102 is stowed on the underside of ring 101. Previously unused brackets 108*a* and 108*b* now accept one of the set of through holes of adjustable tube 115 as pinned to cause the sitting surface of seat 103 to be substantially horizontal despite the sloped ground upon which ring 101 rests. Either or both of inverted brackets 105*a* and 105*b* and the end of adjustable tube 115 which might protrude past ring 101 in to the ground, as well as any other protruding structures can help to stabilize the hunting seat and prevent it from sliding down the sloped ground. The horizontal adjustment of seat 103 is facilitated by selecting one of the plurality of through holes 116 of adjustable tube 115 to be pinned by pin 107*c* at holed brackets 108*a* and 108*b*.

Also, as can be seen in FIG. 9, angle bracket 109 includes a bracket section which acts as a tang to engage the ground in the seat adapted to a sloped ground. Similarly, the longer angle bracket 511 also engages the ground to help stabilize the seat and limit movement of the hunting seat with respect to the sloped terrain.

FIG. 5 through FIG. 10 show one exemplary progression from a hunting seat configured for a sloped terrain to a hunting seat configured for a substantially flat terrain.

Figure 5:
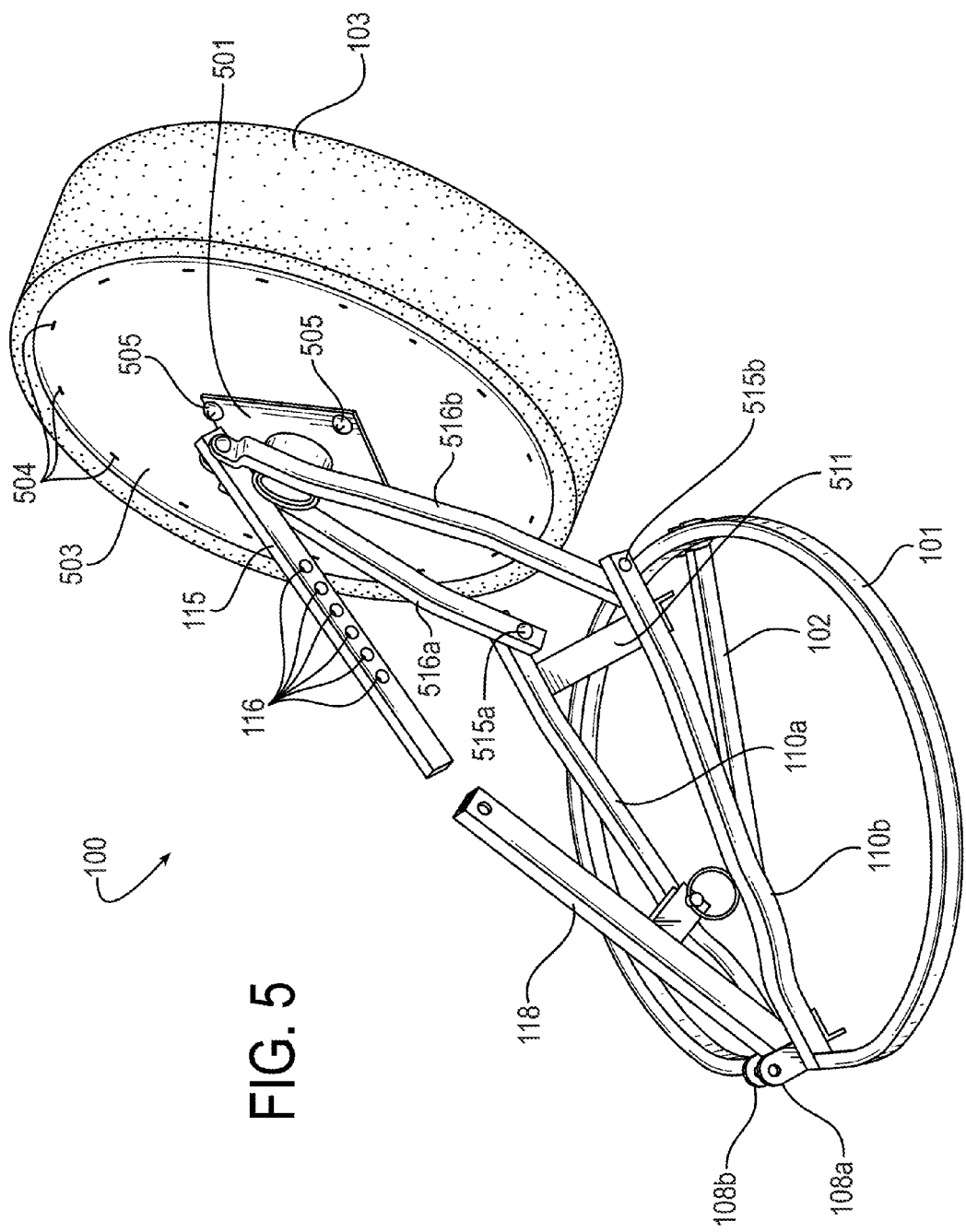
FIG. 5 shows an illustration of the hunting seat of FIG. 1 about to be configured to use as a ground stool.

FIG. 5 shows an illustration of hunting seat 100 about to be configured for use as a ground stool. FIG. 5 shows more detail of how adjustable tube 115 having a plurality of through holes 116 can be fit into tube 118. Also visible supported arms 516*a* and 516*b* which are pivotally attached by pins 515*a* and 515*b* to forked tubes 110*a* and 110*b* and welded to the swivel bracket assembly 501 which supports seat 103. Swivel bracket assembly 501 can be attached to seat 103 by screws 505 that engage a seat structure, such as a round plywood seat base within an upholstered seat 103.

The length adjustment of tube 115 as set by pinning adjustable tube 115 to tube 118 at one of the plurality of through holes 116 can be used to set the height of seat 103 above the base. In the ground stool configuration, the length adjustment can also be used to set the inclination of the seat surface with respect to the ground that base 101 is resting on. Minor corrections to the seat inclination can also be accomplished by the length adjustment.

Figure 6:
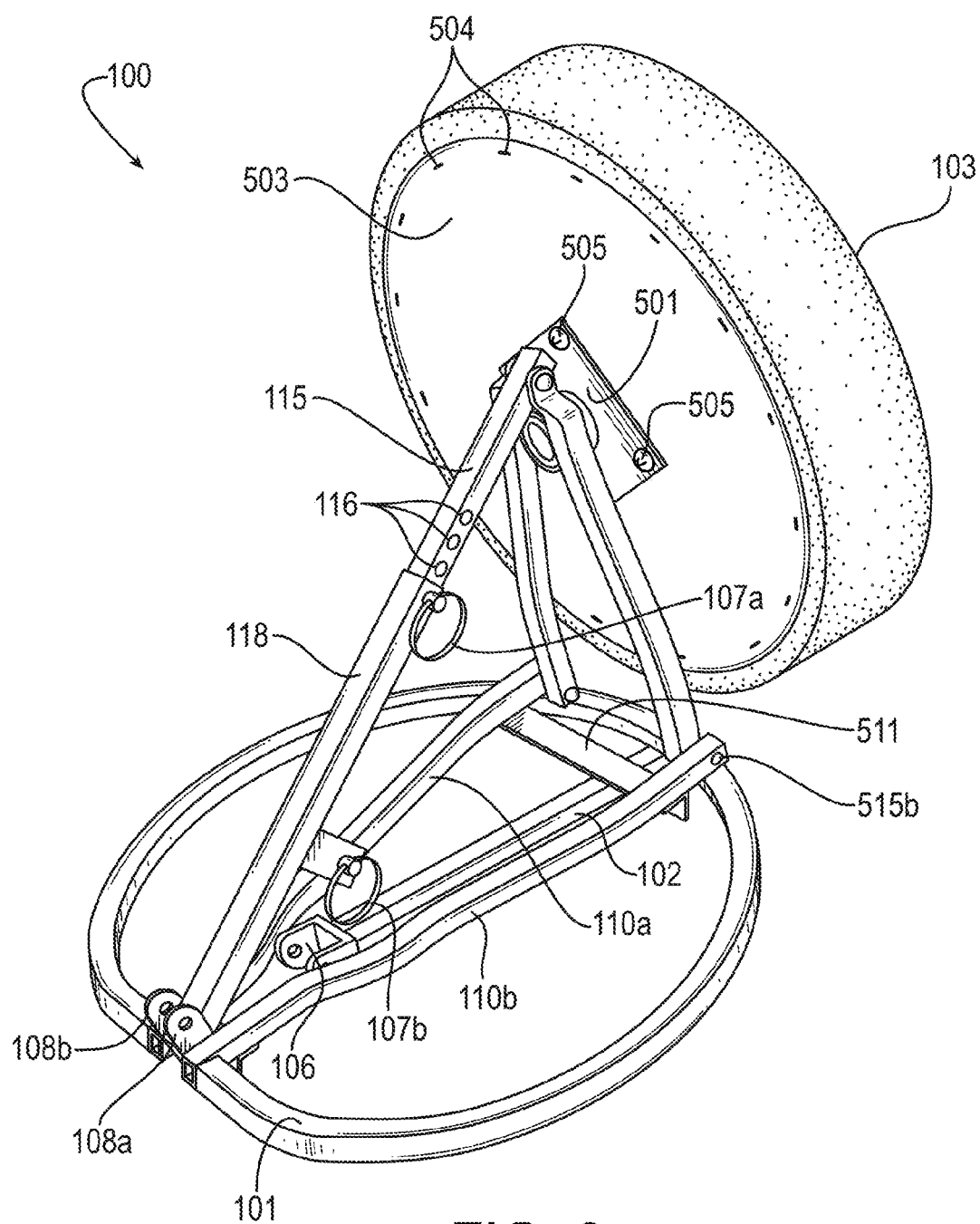
FIG. 6 shows an illustration of hunting seat of FIG. 1 showing more detail of the exemplary upholstered seat.

FIG. 6 shows an illustration of hunting seat 100 where more detail of an upholstered seat 103 can be seen. The vinyl under-seat backing 503 can be seen as stabled to a round plywood seat base (not visible in FIG. 5) by staples 504.

Figure 7:
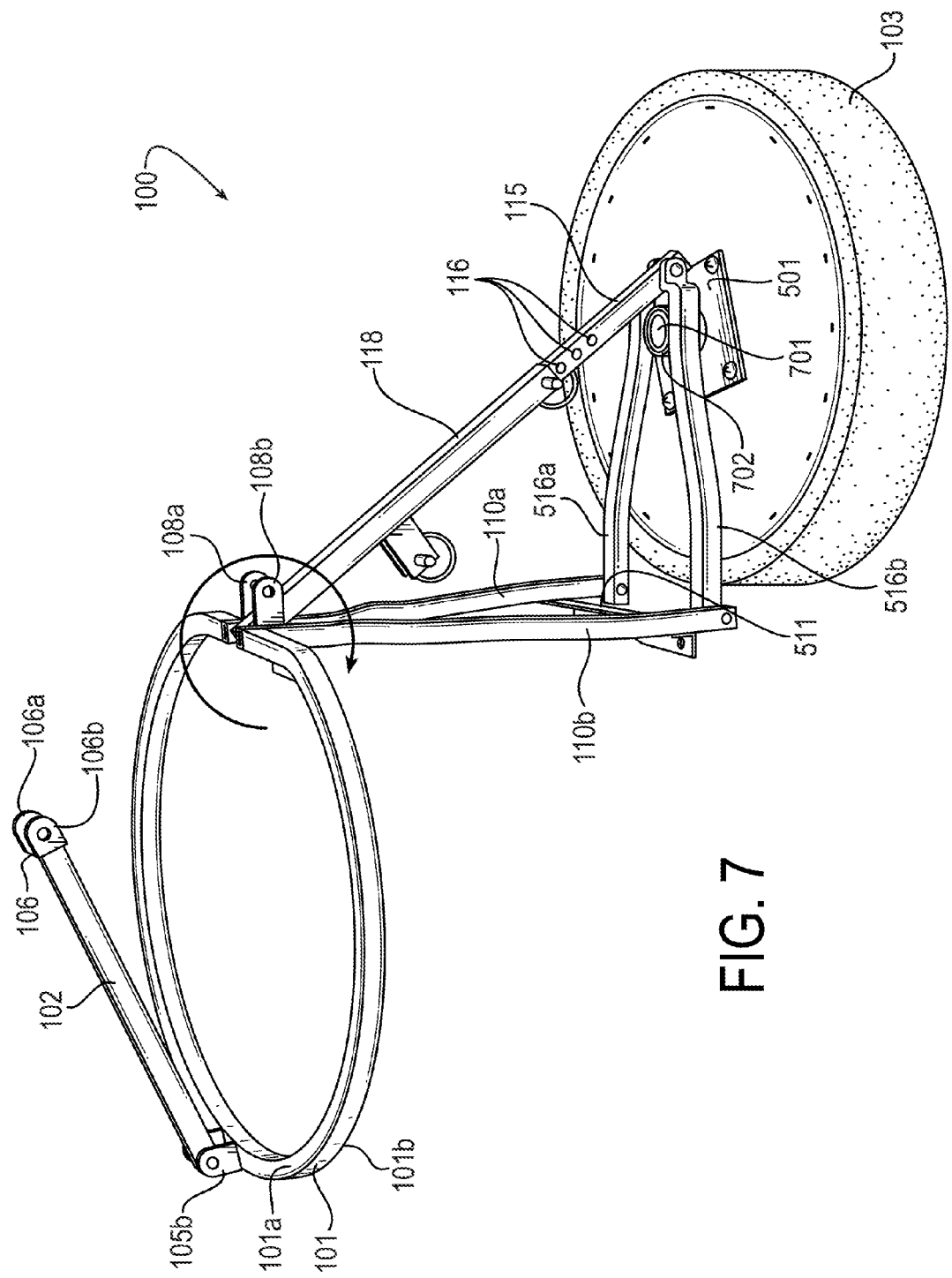
FIG. 7 shows an illustration of the hunting seat of FIG. 1 which shows more detail of how the ring tube swivels pivotally about forked tubes.

FIG. 7 shows an illustration of hunting seat 100 where more detail of how the ring tube 101 swivels pivotally about forked tubes 110*a* and 110*b* can be seen as indicated by the "arrow" in the drawing. Also, rod 701 of the swivel bracket assembly 501 can be seen to rotatingly engage bushing 702 made from a short length of round tubing. Swivel bracket assembly 501 provides 360 degree rotation of seat 103. Also, in FIG. 7, it can be more clearly seen how support tube 102 pivotally attached to ring tube 101 via brackets 105*a* and 105*b* (only 105*b* is visible in FIG. 7).

Figure 8:
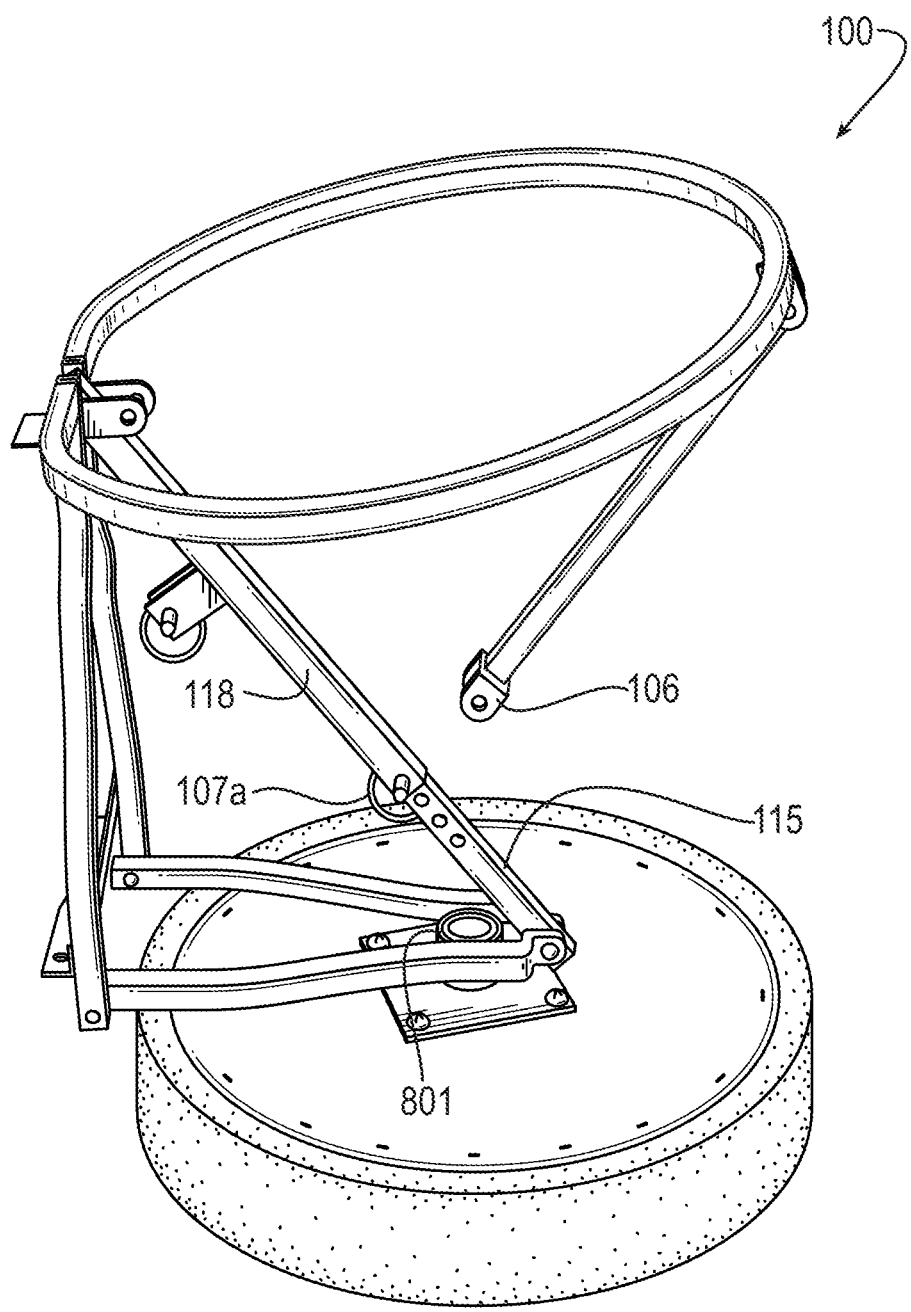
FIG. 8 is an illustration showing the support tube U bracket being positioned to be pinned to the adjustable tube.

FIG. 8 shows in more detail how support tube 102 engages the adjusted pinned parts of tube 118 and adjustable tube 102 as U bracket 106 of support tube 102 is pinned by pin 107*a* to establish a hunting seat 100 used as a ground stool configuration.

FIG. 9 shows the hunting seat 100 used as a ground stool configuration sitting upside down with seat 103 on the ground for a more detailed view of the various tubes, brackets and pins in this ground stool configuration.

Figure 10:
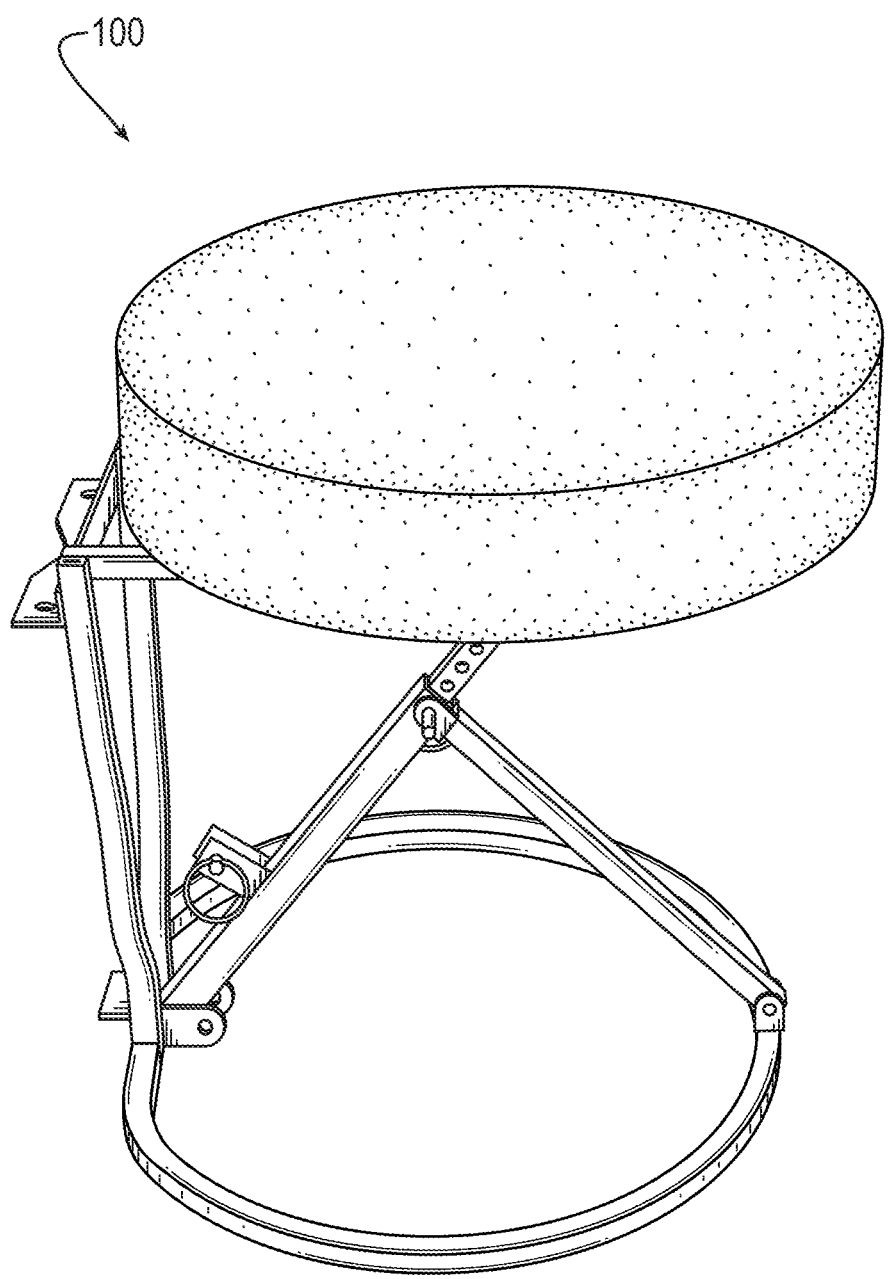
FIG. 10 shows another view of the hunting seat being used in a ground stool configuration.

FIG. 10 shows another view of the hunting seat 100 being used in a ground stool configuration.

Figure 11:
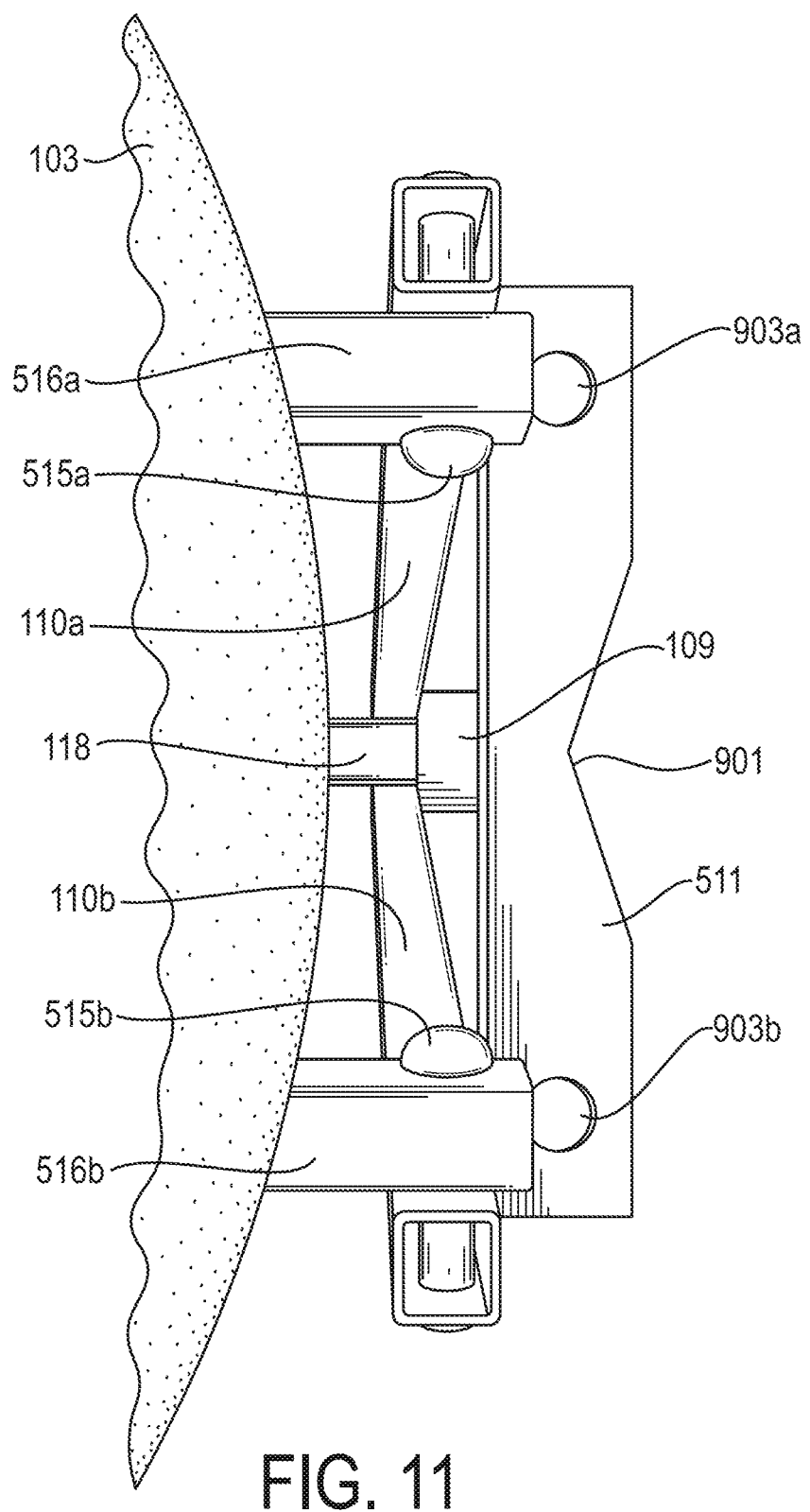
FIG. 11 shows yet another view of the hunting seat from above.

FIG. 11 shows yet another view of the hunting seat from above. The holes 903a and 903b useful for accepting hooks of a strap in the tree configuration (e.g. hook 112a, FIG. 1). Also, the "V" cutout of angle bracket 511 can be seen in more detail in FIG. 11.

In summary, it can be seen that an adjustable tube with a plurality of holes (e.g. adjustable tube 115 with through holes 116) can be used to adjust both the height and inclination of the seat with respect to base both over flat or sloped terrain.

Exemplary assembly and configuration instructions: (color dots used in some embodiments to facilitate assembly and configuration are not visible in the drawings)

Stool

1. Start with seat in the flat (carry) position with all pins in place.
2. Position seat with metal ring down, cushion top up, and the (red dot) six hole adjustment tube pointing right.
3. Pull pin that is holding the (red dot) six hole adjustment tube.
4. Lift seat up 90 degrees or until it stops.
5. Pull pin that is holding the (blue dot) sleeve.
6. Insert (red dot) tube into (blue dot) sleeve, reinsert pin at the 4th hole down• from seat top. This will be approximately a level seat position.
7. Lay seat back onto cushion top.
8. Rotate ring in counter clockwise motion over top.
9. Pull pin that is holding (red dot) adjustment tube & (blue dot) sleeve and position (yellow dot) bracket tube over the two, align holes and reinsert pin thru all three.
10. Take 2nd pin and insert into empty (green dot) bracket.

Tree Seat

1. Use STOOL instructions 1-10.
2. Attach strap to stool by inserting hooks on strap into angle bracket holes at top of seat back.
3. Place seat next to tree and wrap strap around tree. adjusting seat to desired height. Typically, your feet should be able to rest on ground.
4. Insert strap into cam buckle and tighten securely to tree.

Side Hill

1. Use STOOL instructions 1-3.
2. Push the (red dot) six hole adjustment tube in and up to desired seat position, secure with pin in (green dot) bracket Pin alignment will depend on the ground slope.

Flat

1. Use seat in folded position (carry) with all pins in place. Seat sits on ground when no added height is wanted, To Return to Flat or Carry Position From Stool Position.

1. Position seat so top is down. Remove pin in (green dot) bracket.
2. Remove pin holding (red dot. blue dot & yellow dot) tubes. rotate ring clockwise.
3. Slide (red dot) tube and (blue dot) sleeve apart. Lay (red dot) tube down pointing left.
4. Push (blue dot) sleeve back until (green dot) bracket covers (yellow dot) bracket tube and pin will insert to secure (yellow dot) bracket tube. insert pin.
5. Lay ring down toward (red dot) tube, lift to align with empty (green dot) bracket and insert pin to secure.

While in the exemplary embodiments, the base "ring" structure has been shown as a circle with a straight section, it will be understood by those skilled in the art that the base structure need not be a circle or partial circle. For example, the ring structure might include one or more straight sections in place of the circular base shown in the exemplary embodiments. Or, the ring structure (e.g. ring 101) can include a rectangle or square shape. It is further contemplated that any suitable closed curve can be used as the base ring structure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A hunting seat comprising:
   a first support member having a first end rigidly attached to an underside surface of a seat;
   a second support member having a first end pivotally coupled to a second end of said first support member, and a second end of said second support member pivotably coupled to a base by a base pin and a second support member bracket at said second end of said second support member, said base having a first surface and a second surface;
   an adjustment assembly comprising a first adjustment member pivotally attached to the underside surface of the seat and having a series of adjustment holes and a sleeve tube pivotally attached to said base by said base pin and having an adjustment hole to align with a hole of said series of adjustment holes and to accept an adjustment pin;
   wherein in a substantially flat ground use configuration, said base disposed with said first surface facing said underside surface of said seat and said first adjustment member disposed within and pinned to said sleeve tube, and a third support member coupled between the base and said adjustment pin of the adjustment assembly; and
   wherein in a sloped ground use, said base disposed with said second surface facing said underside surface of said seat and said first adjustment member joined to said second end of said second support member at said second support member bracket.

2. The hunting seat of claim 1, wherein said base comprises a ring.

3. A hunting seat comprising:
   a base having a straight section joined by a base pin;
       three tubes pivotally coupled by said base pin to said base, a first tube and a third tube of said three tubes each having a bracket affixed thereto at one end, said first tube and said third tube pivotally coupled at opposite ends respectively to a first seat tube and a second seat tube, said first seat tube and said second seat tube coupled at opposite ends to a seat swivel, said seat swivel rotatingly coupled to a seat post of a seat, a second center tube of said three tubes configured to accept an adjustable tube fixed in place by a pin extending through both said adjustable tube and said second tube in one of a plurality of adjustment holes disposed in said adjustable tube, an opposite end of said adjustable tube pivotally coupled to said seat swivel;
       a pair of brackets welded to said base substantially opposite said straight section pivotally coupled to a support tube having a U bracket at an opposite end;
   wherein in a substantially flat ground use, said U bracket also couples to said second center tube and said adjustment tube by said pin extending through both said adjustable tube to said second tube; and
   in a sloped ground use, said first tube and said third tube pivotally resting substantially on said base opposite from said straight section and said adjustable tube engaged by a pin through one of said plurality of adjustment holes and said brackets affixed thereto at one end.

4. The hunting seat of claim 3, wherein said base comprises a ring.

5. The hunting seat of claim 3, wherein at least one of said tubes is a metallic tube.

6. The hunting seat of claim 3, wherein said seat comprises a plywood circle.

7. The hunting seat of claim 6, wherein said seat swivel is affixed by screws to said plywood circle.

8. The hunting seat of claim 3, wherein said seat swivel is configured to allow said seat to rotate 360 degrees.

9. The hunting seat of claim 3, wherein said seat comprises an upholstered cover.

10. The hunting seat of claim 3, wherein said seat is configured to be strapped to a tree.

11. A method of operating a hunting seat comprising the steps of:
provide a hunting seat having base with a pivotally coupled support structure of tubes configured for use on flat ground or sloped ground comprising a first support member having a first end rigidly attached to an underside surface of a seat, a second support member having a first end pivotally coupled to a second end of said first support member, and a second end of said second support member pivotably coupled to a base by a base pin and a second support member bracket at said second end of said second support member, said base having a first surface and a second surface, an adjustment assembly comprising a first adjustment member pivotally attached to the underside surface of the seat and having a series of adjustment holes and a sleeve tube pivotally attached to said base by said base pin and having an adjustment hole to align with a hole of said series of adjustment holes and to accept an adjustment pin; and rotating said base to a first side in a substantially flat ground use configuration, wherein said base is disposed with said first surface facing said underside surface of said seat and said first adjustment member disposed within and pinned to said sleeve tube, and a third support member coupled between the base and said adjustment pin of the adjustment assembly; or by rotating said base to a second side in a sloped ground use, wherein said base disposed with said second surface facing said underside surface of said seat and said first adjustment member joined to said second end of said second support member at said second support member bracket.

12. The method of claim 11, wherein said step of providing a hunting seat further comprises providing a hunting seat configured for use on flat ground and strappingly coupling said hunting seat to the base of a tree.

13. The method of claim 11, wherein said step of providing a hunting seat having a base comprises providing a hunting seat having a ring base.

* * * * *